United States Patent [19]
Evans et al.

[11] Patent Number: 6,136,215
[45] Date of Patent: Oct. 24, 2000

[54] FIBER TREATMENT COMPOSITION CONTAINING AMINE-, POLYOL-, AMIDE-FUNCTIONAL SILOXANES

[75] Inventors: Martin John Evans, S. Wales, United Kingdom; Howard Edwin Griffin, Greensboro, N.C.; Linda Denise Kennan, Midland, Mich.; Michael Ward Skinner, Midland, Mich.; Kenneth Edward Zimmerman, Midland, Mich.

[73] Assignees: Dow Corning Corporation, Midland, Mich.; Dow Corning, Limited, Barry, United Kingdom

[21] Appl. No.: 09/389,141

[22] Filed: Sep. 2, 1999

[51] Int. Cl.[7] .................................................. D06M 15/643
[52] U.S. Cl. ...................... 252/8.81; 252/8.82; 252/8.83; 252/8.84; 252/8.85; 252/8.86; 427/389.9; 427/391; 427/394; 427/395
[58] Field of Search .................................. 252/8.81, 8.82, 252/8.83, 8.84, 8.85, 8.86; 427/389.9; 428/391, 394, 395

[56] References Cited

U.S. PATENT DOCUMENTS

| | | | |
|---|---|---|---|
| 3,890,269 | 6/1975 | Martin | 528/14 |
| 4,311,626 | 1/1982 | Ona et al. | 260/29.2 M |
| 4,359,545 | 11/1982 | Ona et al. | 524/262 |
| 4,366,001 | 12/1982 | Ona et al. | 106/287.11 |
| 4,409,267 | 10/1983 | Ichinohe et al. | 427/387 |
| 4,427,815 | 1/1984 | Ona et al. | 252/8.61 |
| 4,599,438 | 7/1986 | White et al. | 556/439 |
| 4,624,676 | 11/1986 | White et al. | 8/115.56 |
| 4,661,577 | 4/1987 | Lane et al. | 427/387 |
| 4,680,366 | 7/1987 | Tanaka et al. | 528/27 |
| 4,705,704 | 11/1987 | Lane et al. | 427/389.9 |
| 4,757,121 | 7/1988 | Tanaka et al. | 528/27 |
| 5,100,991 | 3/1992 | Cray et al. | 528/26 |
| 5,118,535 | 6/1992 | Cray et al. | 427/387 |
| 5,132,443 | 7/1992 | Traver et al. | 556/425 |
| 5,593,611 | 1/1997 | Czech | 252/8.63 |
| 5,707,434 | 1/1998 | Halloran et al. | 106/287.11 |
| 5,707,435 | 1/1998 | Halloran | 106/287.11 |
| 5,925,469 | 7/1999 | Gee | 428/447 |
| 5,925,779 | 7/1999 | Cray et al. | 556/425 |

FOREIGN PATENT DOCUMENTS

0399706A2  11/1990  European Pat. Off. ..... D06M 15/643

OTHER PUBLICATIONS

Textile Chemist and Colorist, by Lautenschlager et al., published Mar. 1995, vol. 27, No. 3. pp. 27–29.

*Primary Examiner*—Anthony Green
*Attorney, Agent, or Firm*—Timothy J. Troy; James L. De Cesare

[57] ABSTRACT

A fiber treatment composition is disclosed. The composition contains siloxanes having amine-, polyol, and amide-functionalities. The composition provides good hand, resistance to yellowing, and hydrophilicity to the fibers. The composition is preferably formulated as an aqueous emulsion. Applying the composition to textile fabrics produces treated fabrics having good hydrophilicity, good hand, and resistance to yellowing.

20 Claims, No Drawings

FIBER TREATMENT COMPOSITION CONTAINING AMINE-, POLYOL-, AMIDE-FUNCTIONAL SILOXANES

FIELD OF THE INVENTION

The invention relates to a fiber treatment composition that provides the fiber with hydrophilicity, softness, and resistance to yellowing. More particularly, this invention relates to a fiber treatment composition containing amine-, polyol-, amide-, functional siloxanes.

BACKGROUND OF THE INVENTION

There is a growing need in the textile market for siloxane fabric softeners that not only provide softening but also impart hydrophilicity and other desirable properties to the treated fabric. Using a conventional siloxane polymer as the active ingredient in a fabric treatment agent often requires a trade-off in properties.

Amine-functional polysiloxanes are known to improve the hand of textiles. 'Hand' means the softness and smoothness of the textile. The hand of a treated textile is directly related to the amine content (e.g., the number of amino-functional groups) of the polysiloxane. Generally, as the amine content increases, the hand of the textile improves.

One method to produce amine-functional siloxane compounds for use as fabric treatment agents is to react an epoxy-functional silicone with an amine-functional organic compound. This method is described in U.S. Pat. No. 4,409,267 to Ichinohe et al., Oct. 11, 1983, which discloses a fabric treatment composition. The organopolysiloxane is prepared by a process comprising: 1) reacting a silanol-functional organopolysiloxane with a polyoxyalkylene compound and an epoxy-functional compound, by addition reaction and thereafter 2) reacting an amine compound with the epoxy group of the epoxy-functional organopolysiloxane. The reactions are typically carried out in the presence of a solvent. The solvent and any impurities formed during reaction must then be removed. This method suffers from the drawback that unsubstituted amine groups can be present, which cause yellowing when the organopolysiloxane is applied to fabrics.

U.S. Pat. No. 5,593,611 to Czech, Jan. 14, 1997, discloses a fabric treatment composition comprising an aminopolysiloxane. The aminopolysiloxane is prepared by hydrolyzing and condensing an amino-functional dialkoxysilane with water in the presence of heat and a base catalyst. The aminopolysiloxane is hydrophobic and has a molecular weight of at least 30,000.

U.S. Pat. No. 4,757,121 to Tanaka et al., Jul. 12, 1988, discloses a fiber softening composition for synthetic fibers. The composition contains a combination of 2 different amino-substituted organopolysiloxanes, an epoxy-substituted alkoxysilane, and a monoepoxy compound. The first amino-substituted organopolysiloxane is terminated with a hydroxy group or alkoxy group that reacts with the epoxy-containing alkoxysilane. This forms a film of a crosslinked composition on the fiber surface. The second amino-substituted alkoxysilane is trialkyl-silyl terminated, and the second organopolysiloxane is prepared by reacting an amino-containing organopolysiloxane with a liquid organic epoxy compound.

U.S. Pat. No. 4,680,366 to Tanaka et al., Jul. 14, 1987, discloses a fabric finishing agent containing an organopolysiloxane with primary and secondary amine-functional hydrocarbon groups and polyoxyalkylene groups. The organopolysiloxane can be emulsified in water and applied to fabric to provide softness and anti-static properties. The organopolysiloxane is prepared by reacting a polyoxyalkylene glycidyl ether with an amino-functional organopolysiloxane.

However, the amine-functional polyorganosiloxanes suffer from the drawback that as the amine content of the polyorganosiloxane increases, the tendency of the textile to discolor or yellow increases. Additionally, the amine-functionality tends to impart hydrophobicity to the treated textile.

To minimize yellowing, it has been the practice in the textile industry to impart softness to a textile by applying a modified polysiloxane, which contains amide groups or carbamate groups instead of amine groups. However, amide and carbamate groups do not provide the same desirable level of softness characteristic of the amine groups.

For example, another method for producing amine-functional siloxanes for use in fabric treatment agents is disclosed in "Structure Activity Relationships of Amino-functional Siloxanes as Components in Softening Finishes", *Textile Chemist and Colorist*, by Lautenschlager et al., published Mar. 1995, Vol. 27, No. 3. Lautenschlager et al. disclose that epoxidation is not a viable alternative to an improved softener because of impurities formed during the reaction. Alternatively, Lautenschlager et al. disclose acylated aminofunctional silicones that can be used in fabric softening finishes, and a method for their preparation by acylation of an aminofunctional silicone fluid. The acylating agent can be an anhydride, lactone, or carbonate. However, the resulting acylated aminofunctional silicones exhibit a decline in hand when compared to standard aminosiloxanes.

Therefore, it is an object of this invention to provide an amine-, polyol, amide-functional siloxane copolymer or a blend of siloxanes having amine-, polyol-, and amide-functional groups that can be used in fiber treatment compositions.

U.S. Pat. No. 5,118,535 to Cray et al., Jun. 2, 1992, discloses a method for treating fibrous materials comprising applying a composition containing a cyclic diamine functional polydiorganosiloxane. The composition can be a solution, dispersion, or emulsion.

EP A2 0 399 706 by Cray, published on Nov. 28, 1990, discloses a method for treating fibrous materials. The method comprises pre-reacting an amine-containing organosiloxane with a monoepoxide, and thereafter applying the resulting product to the fibers. The product has primary, secondary, and tertiary amine groups, where up to 10% of the amine groups are primary amine groups.

U.S. Pat. No. 4,311,626 to Ona et al., Jan. 19, 1982, discloses a composition containing an aminofunctional polydiorganosiloxane and a carboxylfunctional polydiorganosiloxane. The composition is used to treat fibers to impart smoothness, crease resistance, elongation recovery, and compression recovery. However, carboxyl groups detrimentally affect the hand of the treated fibers.

U.S. Pat. No. 4,366,001 to Ona et al., Dec. 28, 1982, discloses a fiber treating composition that contains at least 2 of 3 types of organofunctional siloxanes. The first is an amino-functional siloxane, the second is a carboxyl-functional siloxane, and the third is an epoxy-functional siloxane. At least one of the organofunctional siloxanes contains at least one polyoxyalkylene group. The composition provides antistatic character, moisture absorbability, stain resistance, pliability, smoothness and compression recovery.

However, none of these references disclose a fiber treatment composition that imparts hydrophilicity and provides resistance to yellowing to textile fibers, without a detriment to hand. Therefore, it is a further object of this invention to provide a fiber treatment composition that provides all of these desired properties.

SUMMARY OF THE INVENTION

This invention relates to a fiber treatment composition containing siloxanes having amine-, polyol, and amide-functionalities. The combination of amine-, polyol-, and amide-functionalities provides a synergistic effect in that the fiber treatment composition provides resistance to yellowing and provides hydrophilicity to the treated fiber without significant detriment to the hand of the fiber.

DETAILED DESCRIPTION OF THE INVENTION

This invention relates to a fiber treatment composition. The composition comprises active ingredient (A), which is selected from the group consisting of
  (I) a combination comprising
    (a) an amine-, polyol-functional siloxane, and
    (b) a polyol-, amide-functional siloxane; and
  (II) an amine-, polyol-, amide-functional siloxane copolymer.

Component (a), the amine-, polyol-functional siloxane, has a formula:

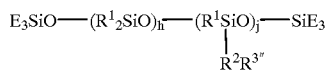

wherein each E is independently selected from the group consisting of a monovalent hydrocarbon group, a hydroxyl group, and an alkoxy group; each $R^1$ is independently a monovalent hydrocarbon group; each $R^2$ is independently a divalent hydrocarbon group having 1 to 10 carbon atoms; h is 25 to 1,000; and j is 0.1 to 200. Each $R^{3"}$ is generally a heterocyclic nitrogen-containing compound, which may be, e.g.,

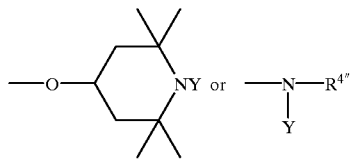

wherein each $R^{4"}$ is independently selected from the group consisting of a hydrogen atom, a monovalent hydrocarbon group and a group of formula—$R^2NY_2$, each Y is independently a hydrogen atom or Y', with the proviso that not all Y=hydrogen, and each Y' is a group of the formula

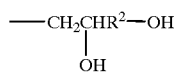

Each E is an endblocking group independently selected from the group consisting of monovalent hydrocarbon groups, hydroxyl groups, and alkoxy groups. The selection of endblocking groups depends on the method used to make component (i) the amine-functional siloxane, infra, used to prepare (A) the active ingredient of the composition. The monovalent hydrocarbon groups suitable as endblocking group E are monovalent hydrocarbon groups, preferably alkyl or aryl groups. When the endblocking group E is an alkoxy group, it preferably has 1 to 18 carbon atoms.

Each $R^1$ is independently a monovalent hydrocarbon group. $R^1$ is exemplified by alkyl such as methyl, ethyl, propyl, butyl, pentyl, and hexyl; aryl such as phenyl, tolyl, and xylyl; and aralkyl such as benzyl and phenethyl. Alkyl groups are preferred, and methyl is particularly preferred.

Each $R^2$ is independently a divalent hydrocarbon group of 1 to 10 carbon atoms. The divalent groups are exemplified by alkylene groups such as ethylene, propylene, butylene, isobutylene, and methylpropylene; and alkylene-arylene groups expressed by the formula —$(CH_2)_2$—$C_6H_4$. Alkylene groups such as ethylene, propylene, and isobutylene groups are preferred.

Preferably, $R^1$ is an alkyl group such as methyl, $R^2$ is an alkylene group such as isobutyl, h is 75 to 400, and j is 0.75 to 20.

Preferably, Y' is

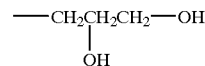

Component (a) the amine-, polyol-functional siloxane can be prepared by methods such as the method disclosed in European Patent Application No. 0 399 706 A2, published on Nov. 28, 1990. This method comprises reacting an amine-functional siloxane with an epoxy-functional compound.

More preferably, (a) the amine-, polyol-functional siloxanes used in this invention are prepared by the following method. First, component (i) an amine-functional siloxane is prepared by base equilibration using a catalyst known in the art. A preferred method comprises heating to 150° C., a composition comprising a polydiorganosiloxane; an endblocker, such as hexamethyldisiloxane; an amine-functional silane or amine-functional siloxane; and water in the presence of the catalyst. While heating, a mild strip is applied to the system to remove by-products such as water and alcohol. After formation of component (i), the reaction mixture can be stripped to remove low boiling impurities from component (i).

In a particularly preferred embodiment of the invention, component (i) is formed by a condensation reaction process. The condensation reaction process comprises
  I) heating a mixture comprising silanol-endblocked polydimethylsiloxane, an alcohol, and an aminosilane, in the presence of a catalyst, and thereafter
  II) gradually reducing pressure to promote condensation polymerization by removing by-products from the reaction mixture.

The alcohol is preferably a blend of linear alcohols having 10 to 15 carbon atoms. Suitable alcohols are commercially available.

The catalyst used step I) may be, e.g., barium hydroxide, trisodium orthophosphate, and combinations thereof. The mixture in step 1 is typically heated to 85° to 120° C. for a period of 1 to 5 hours.

The by-products formed in step II) are water and alcohol. Pressure in step II) is typically reduced to 600 mBar to 200 mBar. After the viscosity of the product of step II) is stabilized, pressure is returned to ambient and the product is cooled in an inert atmosphere.

Component (i) the amine-functional siloxane has the general formula:

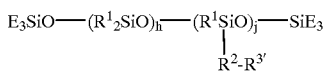

where $R^1$, $R^2$, h, and j are as described above, with h preferably being from about 75 to 400. $R^{3'}$ is generally a heterocyclic nitrogen-containing compound, which may be, e.g.,

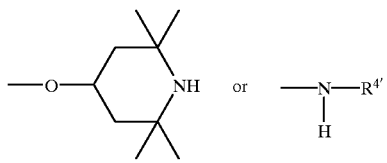

where each $R^{4'}$ is selected from the group consisting of a hydrogen atom, a monovalent hydrocarbon and a group of the formula —$R^2NH_2$.

When (i) the amine-functional siloxane is prepared by the base equilibration process, each E is a monovalent hydrocarbon group, preferably an alkyl or aryl group. When the amine-functional siloxane is prepared by the condensation reaction process, each E is independently selected from the group consisting of monovalent hydrocarbon groups, hydroxyl groups, and alkoxy groups.

The amine-functional siloxane (i) is then reacted with (ii) an epoxy-functional compound to form (a) the amine-, polyol-functional siloxane, described above.

Component (ii) is an epoxy-functional compound having a general formula:

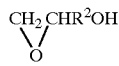

where $R^2$ is a divalent hydrocarbon group as described above. Suitable epoxy-functional compounds for component (ii) include glycidol, 2,3-epoxy-cyclopentanol, and 3,3-epoxy-6-methylcyclohexylmethanol. Glycidol is preferred.

Component (b) is a polyol-, amide-functional siloxane having a general formula:

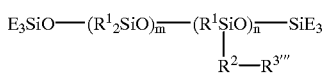

wherein E, $R^1$, and $R^2$ are as described above, m is 25 to 1,000, and n is 0.1 to 200. Each $R^{3'''}$ is generally a heterocyclic nitrogen-containing compound, which may be, e.g.,

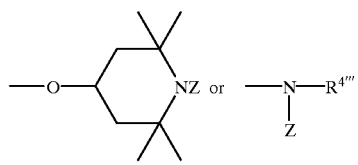

where each $R^{4'''}$ is independently selected from the group consisting of: a hydrogen atom and a group of formula —$R^2NZ_2$, each Z is selected from the group consisting of a hydrogen atom and Z', with the proviso that not all Z=hydrogen, and Z' is a group of the formula

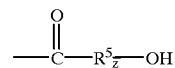

where each $R^5$ is a divalent hydrocarbon group of 1 to 7 carbon atoms and z is an integer from 1 to 7 inclusive.

Preferably, $R^1$ is an alkyl group such as methyl, $R^2$ is an alkylene group such as isobutyl, m is 75 to 400, and n is 0.1 to 20. Preferably Z' is

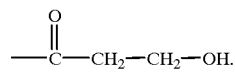

The polyol-, amide-functional siloxane is produced by reacting (i) an amine-functional siloxane, as described above, with (iii) a material selected from the group consisting of anhydrides, carbonates, and lactones. The polyol-, amide-functional siloxane is preferably produced by the method disclosed by Cray et al. in U.S. Pat. No. 5,100,991, which is hereby incorporated by reference. The preferred method comprises reacting (i) an amine functional siloxane with (iii) a lactone.

Component (iii) is selected from the group consisting of anhydrides, carbonates, and lactones. Suitable anhydrides are selected from the group consisting of

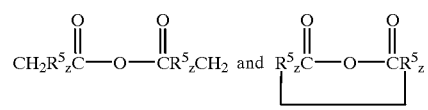

where each $R^5$ is independently hydrogen or a divalent hydrocarbon group of 1 to 7 carbon atoms, and z is an integer from 1 to 7, as described above. Suitable carbonates have the formula

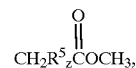

where $R^5$ and z are as described above.

However, lactones are preferred as component (iii). Suitable lactones are disclosed in U.S. Pat. No. 5,100,991. Suitable lactones have the formula

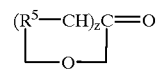

where $R^5$ and z are as described above. Preferably, each $R^5$ represents a group with 1 carbon atom and z is 3 to 6. The lactone is exemplified by butyrolactone, epsilon caprolactone, and delta gluconolactone. Butyrolactone and epsilon caprolactone are particularly preferred.

In an alternative embodiment of the invention, (A) the active ingredient comprises ingredient (II), an amine-, polyol-, amide-functional siloxane copolymer. The copolymer has the general formula:

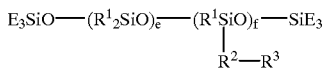

wherein E, $R^1$, and $R^2$ are as described above, e is 25 to 1,000, and f is 0.1 to 200. Each $R^3$ is generally a heterocyclic nitrogen-containing compound, which may be, e.g.,

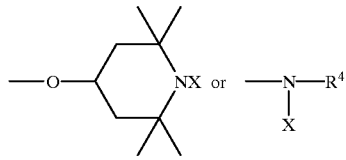

wherein each $R^4$ is independently selected from the group consisting of a hydrogen atom, a monovalent hydrocarbon and a group of formula —$R^2NX_2$, where each X is independently a hydrogen atom or X', with the proviso that not all X=hydrogen, each X' is independently selected from the group consisting of Y' and Z'. The Y' groups have the formula

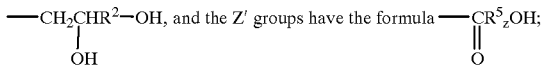

where each $R^2$, $R^5$, and z are as described above. Preferably, e is 75 to 400, and f is 0.85 to 20.

Typically, the amount of X and X' represented by Y' is 0.1 to 2.9 mol %, preferably 0.9 to 2.1 mol %, of the copolymer molecule. Typically, the amount of X and X' represented by Z' is 0.01 to 2.9 mol %, preferably 0.01 to 0.05 mol %, of the copolymer molecule.

Preferably, Y' is —CH$_2$CH(OH)CH$_2$—OH.

Preferably, Z' is —C(=O)—CH$_2$—CH$_2$—CH$_2$—OH.

The amine-, polyol-, amide-, functional siloxane copolymer can be prepared by reacting
(i) the amine-functional siloxane described above;
(ii) the epoxy-functional compound described above; and
(iii) the material selected from the group consisting of anhydrides, carbonates, and lactones, described above.

Typically, the amount of component (i) is 90 to 99 wt %, the amount of component (ii) is 0.5 to 9 wt %, and the amount of component (iii) is 0.1 to 5 wt %. The copolymer is typically prepared by heating components (i), (ii), and (iii) to 80 to 115° C. for several hours.

The fiber treatment composition comprises active ingredient (A), as described above. Active ingredient (A) may further comprise (III) an organic fiber treatment compound, (IV) an organosiloxane fiber treatment compound, e.g., dimethylsilicone or organofunctional silicone and combinations thereof.

The fiber treatment composition may further comprise one or more optional ingredients. For example, the following optional ingredients can be added to the fiber treatment composition: (B) a carrier, (C) one or more surfactants, (D) an organic acid, (E) a thickener, (F), a crease resist resin, (G) an oil soluble colorant, (H) a water soluble colorant, and combinations thereof.

Ingredient (B) is a carrier selected from the group consisting of water, organic solvents and low molecular weight silicones. Suitable organic solvents include hydrocarbons such as aromatic hydrocarbons exemplified by toluene, benzene, and xylene; alkanes exemplified by hexane and heptane; ketones exemplified by acetone, methyl ethyl ketone, and methylisobutyl ketone; and alcohols. Ingredient (B) is preferably water.

Ingredient (C) is selected from the group consisting of cationic and nonionic surfactants. Nonionic surfactants are preferred. The amount of ingredient (C) is typically about 3 to 25 wt % of the emulsion.

The emulsion can further comprise optional ingredient (D), an organic acid. Ingredient (D) is preferably glacial acetic acid. The amount of ingredient (D) in the emulsion typically ranges from greater than 0 to 2 wt % of the emulsion.

The fiber treatment composition can have any suitable form. For example, the composition can be applied to the fibers neat. However, the fiber treatment composition can be a solution, dispersion, or emulsion. Preferably, the fiber treatment composition is an emulsion comprising:
i) a discontinuous phase comprising active ingredient (A),
ii) a continuous phase comprising ingredient (B), and
iii) ingredient (C), a surfactant. Ingredient (D), an organic acid, is preferably added to the emulsion. The amount of active ingredient (A) in the emulsion is typically 5 to 50 wt %. Preferably, the active ingredient (A) is 10 to 20 wt % of the emulsion. A method for the preparation of an emulsion of an organopolysiloxane is disclosed in U.S. Pat. No. 5,258,451, which is hereby incorporated by reference.

This invention further relates to a method for preparing a fiber treatment composition. The method comprises combining active ingredient (A) with ingredient (B) and any other optional ingredients. Typically, active ingredient (A) and ingredient (B) are combined by a process selected from the group consisting of dissolving, dispersing, and emulsifying.

When active ingredient (A) contains more than 1 component, the fiber treatment composition can be prepared by independently combining each component separately with optional ingredients to form a plurality of treatment agents. The plurality of treatment agents can then be combined before application to the fibers, or they can be applied to the fibers simultaneously or sequentially. For example, when a combination of components (a) and (b) will be used as the active ingredient (A), the fiber treatment composition can be prepared by forming (1) a first treatment agent comprising component (a) and ingredient (B) and (2) a second treatment agent comprising component (b) and ingredient (B). Preferably, (1) the first treatment agent and (2) the second treatment agent are both emulsions, ingredient (B) is water, and (1) the first treatment agent further comprises a first surfactant and (2) the second treatment agent further comprises a second surfactant. Treatment agents (1) and (2) can then be mixed together and thereafter applied to the fibers. Alternatively, treatment agent (1) can be applied to the fibers, and thereafter treatment agent (2) can be applied to the fibers. Alternatively, treatment agent (2) can be applied to the fibers, and thereafter treatment agent (1) can be applied to the fibers.

This invention further relates to a method for treating fibers. The method comprises applying the fiber treatment composition to the fibers and thereafter removing the carrier, if any. The fiber treatment composition can be applied to the fibers by any convenient method. For example, the composition can be applied by padding, dipping, or spraying. When the fiber treatment composition comprises more than 1 solution, dispersion, or emulsion, the solutions, dispersions, and emulsions can be applied simultaneously or sequentially to the fibers.

The fiber treatment composition can be applied to the fibers during making the fibers, during making a fabric from the fibers, or later, such as during laundering the fabric. After application, the carrier can be removed from the fiber treatment composition by, for example, drying at ambient or elevated temperature.

The amount of fiber treatment composition applied to the fibers is typically sufficient to provide 0.1 to 15 wt % of the active ingredient on the fibers, based on the dry weight of the fibers. Preferably, the amount of active ingredient on the fibers is 0.2 to 1 wt % based on the dry weight of the fibers.

The fibers that can be treated with the composition described above are not specifically restricted. Suitable fibers include natural fibers such as cotton, silk, linen, and wool; regenerated fibers such as rayon and acetate; synthetic fibers such as polyesters, polyamides, polyacrylonitriles, polyethylenes, polypropylenes; and combinations and blends thereof.

The form of the fibers is not specifically restricted. The fiber treatment composition is suitable for use on threads, filaments, tows, yarns, woven fabrics, knitted materials, nonwoven materials, and others.

The fiber treatment composition of this invention has the following advantages:
1. the composition imparts hydrophilicity to the fibers,
2. the composition provides yellowing resistance to the fibers, and
3. the composition provides an improvement to hand without significant detriment to hydrophilicity and yellowing resistance. 'Hand' means the softness and smoothness of the fabric. The amine-functional groups provide superior hand to the fabric. The polyol and amide functionalities provide hydrophilicity and resistance to yellowing.

EXAMPLES

These examples are intended to illustrate the invention to those skilled in the art and should not be interpreted as limiting the scope of the invention set forth in the claims.

Reference Example 1

Emulsion samples were prepared by the following method.
1. The active ingredient was combined with 2 surfactants and a first charge of acid, and this mixture was stirred for 15 minutes. The surfactants used were GENAPOL® UD 050 and GENAPOL® UD 110. GENAPOL® UD 050 and GENAPOL® UD 110 are ethoxylated C11 branched and linear alcohols having CAS No. 127036242, available from Hoechst Celanese. The acid was glacial acetic acid.
2. A first water charge was added to the mixture from step 1, and the resulting mixture was stirred for 30 minutes.
3. A second water charge was added to the mixture from step 2, and the resulting mixture was stirred for 30 minutes.
4. A third water charge was added to the mixture from step 3, and the resulting mixture was stirred for 30 minutes.
5. A second acid charge and a fourth water charge were added to the mixture from step 4. The resulting mixture was stirred for 1 hour.

The formulation of the emulsion samples is in Table 1. The emulsion samples were formulated to provide 1 wt % of the active ingredient on the fiber to which the emulsion was applied.

TABLE 1

Emulsion Formulation

| Ingredient | Amount (Weight % based on total weight of the emulsion) |
|---|---|
| Active Ingredient | 20 |
| GENAPOL ® UD 050 | 3 |
| GENAPOL ® UD 110 | 7 |
| $1^{ST}$ Acid Charge | 0.1 |
| $1^{ST}$ Water Charge | 4 |
| $2^{ND}$ Water Charge | 4 |
| $3^{RD}$ Water Charge | 41.9 |
| $4^{TH}$ Water Charge | 19.8 |
| $2^{TH}$ Acid Charge | 0.2 |

Reference Example 2—Evaluation of Emulsion Samples

Each emulsion sample was then applied to 100% cotton interlock knit fabric (TESTFABRICS® style #460). The treated fabric was dried and cured at 150° C for 3 minutes. The treated fabric was then conditioned at room temperature overnight.

The whiteness index, hand, and absorbency were then measured on each sample. Whiteness index is a dimensionless number computed from colorimetric data. Whiteness index was determined by averaging the results of 3 readings per sample with a HUNTERLAB® colorimeter, as described in ASTM E 313-96.

Hand is a relative measurement provided by a panel of experienced evaluators. Hand of each sample is ranked on a scale of 1 to X, X being the number of samples evaluated relative to each other. A rating of 1 indicates the best hand, i.e. softest and smoothest feel, and higher numbers indicate decreasing hand.

Absorbency is measured by AATCC (American Association of Textile Chemist and Colorist) Test Method 79-1995-Absorbance of Bleached Textiles. This method is: A drop of water is allowed to fall from a fixed height onto the taut surface of a fabric test specimen. The time required for the specular reflection of the water drop to disappear is measured and recorded as wetting time. Absorbency was measured after conditioning at room temperature overnight. In some examples, absorbency was measured again 1 week later, and again 1 month later.

Example 1

Sample 1 was an emulsion prepared by the method of Reference Example 1. The active ingredient was Copolymer (1), shown in Table 2. Copolymer (1) was prepared as follows.

Hydroxy-terminated dimethylsiloxane having a viscosity of 70 cSt at 25° C. (216.07 g), aminoethylaminoisobutylmethyldimethoxysilane (14.08 g), polydimethylsiloxane fluid having a viscosity of 15 cSt at 25° C. (21.79 g), deionized water (5.0 g), and hydroxy-terminated dimethylsiloxane with tetrabutylphosphonium chloride (2.5 g), were combined in a 500 mL flask equipped with a condenser, and a Dean Stark trap. This combination was heated at 115° C. for 4 hours, and then heated to 150° C. for 1 hour. The resulting polymer was stripped by heating at 150° C. under full vacuum, and thereafter the stripped polymer was cooled to 80° C.

Glycidol (9.48 g) was added to the stripped polymer. The glycidol and polymer were heated to 115° C. for 4 hours. The resulting polymer was cooled to 100° C.

Butyrolactone (0.92 g) was added to the polymer. The polymer and butyrolactone were heated at 100° C. for 4 hours, thereby forming Copolymer (1).

Copolymer (1) was formulated in an emulsion by the method of Reference Example 1. The emulsion was applied to a fabric, and whiteness index, hand, and absorbency were measured as in Reference Example 2. The results are in Table 3.

Example 2

Sample 2 was an emulsion prepared by the method of Reference Example 1. The active ingredient was Copolymer (2), shown in Table 2. Copolymer (2) was prepared as follows.

Hydroxy-terminated dimethylsiloxane having a viscosity of 70 cSt at 25° C. (216.07 g), aminoethylaminoisobutylmethyldimethoxysilane (14.08 g), polydimethylsiloxane fluid having a viscosity of 15 cSt at 25° C. (21.79 g), deionized water (5.0 g), and hydroxy-terminated with tetrabutylphosphonium chloride dimethylsiloxane (2.5 g), were combined in a 500 mL flask equipped with a condenser, and a Dean Stark trap. This combination was heated at 115° C. for 4 hours, and then heated to 150° C. for 1 hour. The resulting polymer was stripped by heating at 150° C. under full vacuum, and the stripped polymer was cooled to 80° C.

Glycidol (9.48 g) and butyrolactone (0.92 g) were added to the stripped polymer. The glycidol, butyrolactone, and polymer were heated to 100° C. for 4 hours. This yielded copolymer (2), which was formulated in an emulsion according to the method of Reference Example 1.

The emulsion was applied to a fabric, and whiteness index, hand, and absorbency were measured as in Reference Example 2. The results are in Table 3.

Example 3

Sample 3 was an emulsion prepared by the method of Reference Example 1. The active ingredient was a blend of 99 wt % of an amine-, polyol-functional siloxane and 1 wt % of a polyol-, amide-functional siloxane, as shown in Table 2.

The emulsion was applied to a fabric, and whiteness index, hand, and absorbency were measured as in Reference Example 2. The results are in Table 3.

Comparative Example 1

Sample C1 was prepared by the method in Reference Example 1. The active ingredient was an amine-, polyol-functional siloxane that was prepared by reaction of dimethyl methyl(aminoethylaminoisobutyl) siloxane with glycidol. The active ingredient is shown in Table 2.

The emulsion was applied to a fabric, and whiteness index, hand, and absorbency were measured as in Reference Example 2. The results are in Table 3.

Comparative Example 2

Sample C2 was prepared by the method of Reference Example 1. The active ingredient comprised a polyol-, amide-functional siloxane. The active ingredient is shown in Table 2.

The emulsion was applied to a fabric, and whiteness index, hand, and absorbency were measured as in Reference Example 2. The results are in Table 3.

Comparative Example 3

Sample C3, a sample of untreated 100% cotton knit fabric, was evaluated for absorbency, whiteness index, and hand, according to the methods in Reference Example 2. The results are in Table 3.

TABLE 2

| | Active Ingredient |
|---|---|
| Sample | Active Ingredient |
| 1 | $(CH_3)_3SiO((CH_3)_2SiO)_{98}(CH_3SiO)_2Si(CH_3)_3$ with pendant group $CH_2CHCH_2NXCH_2CH_2NXCH_2CHCH2(OH)$, with $CH_3$ and $OH$ substituents, where 50% of all instances of X have formula 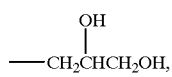 $-CH_2CHCH_2OH$, with $OH$, 25% of X has formula  $-C(CH_2)_3OH$, with $=O$, and 25% of X is a hydrogen atom. |
| 2 | $(CH_3)_3SiO((CH_3)_2SiO)_{98}(CH_3SiO)_2Si(CH_3)_3$ with pendant group $CH_2CHCH_2NXCH_2CH_2NXCH_2CHCH2(OH$ with $CH_3$ and $OH$ substituents |

TABLE 2-continued

Active Ingredient

| Sample | Active Ingredient |
|---|---| where 66% of all instances of X have formula $$-CH_2\underset{\underset{OH}{|}}{C}HCH_2OH,$$

17% of X formula $$-\underset{\underset{}{\overset{O}{\|}}}{C}(CH_2)_3OH,$$

and 17% of X is a hydrogen atom.

C1   a mixture of 10 wt % of cyclic dimethylsiloxane with 90 wt % of $$(CH_3)_3SiO((CH_3)_2SiO)_{392}(CH_3\underset{\underset{X}{|}}{Si}O)_8Si(CH_3)_3$$

where X is $$CH_2\underset{\underset{CH_3}{|}}{C}HCH_2NH(CH_2)_2NH\overset{\overset{O}{\|}}{C}O(CH_2)_3OH.$$

C2   a mixture of 10 wt % of cyclic dimethylsiloxane with 90 wt % of $$(CH_3)_3SiO((CH_3)_2SiO)_{392}(CH_3\underset{\underset{X}{|}}{Si}O)_8Si(CH_3)_3$$

where X is $$CH_2\underset{\underset{CH_3}{|}}{C}HCH_2NH(CH_2)_2NH\overset{\overset{O}{\|}}{C}O(CH_2)_3OH.$$

C3   none

TABLE 3

Water Absorbency, Whiteness Index, and Hand of Each Sample

| Sample No. | Whiteness Index | Hand | Absorbency (seconds) |
|---|---|---|---|
| 1 | 67.29 | 3 | 3.6 |
| 2 | 66.39 | 2 | 4.0 |
| 3 | 69.78 | 1 | 2.6 |
| C1 | 70.30 | 4 | 1.0 |
| C2 | 71.21 | 5 | <1 |
| C3 | 72.55 | 6 | Immediate |

Example 3 shows that when the active ingredient is a combination of an amine, polyol-functional siloxane and a polyol-, amide-functional siloxane, good whiteness index, hand, and absorbency can be obtained. Sample 3 provided better hand than any other samples. Sample 3 also provided better whiteness index, hand, and absorbency than the samples with copolymers as the active ingredient.

Example 1 shows that compositions with copolymer 1 as the active ingredient provided comparable hand and absorbency to compositions with copolymer 2 as the active ingredient. Example 2 shows that copolymer 2 provided better hand than either an amine-, polyol-functional siloxane alone or a polyol-, amide-functional siloxane alone.

Comparative Example 1 shows that an amine-, polyol-functional siloxane active ingredient provides poorer hand than the copolymers in samples 1 and 2 and the blend in sample 3. Comparative Example 2 shows that a polyol-, amide-functional siloxane provides poorer hand than the copolymers in samples 1 and 2 and the blend in sample 3.

Comparative Example 3 shows that hand is poorest with untreated cotton fabric.

We claim:

1. A fiber treatment composition comprising (A) an active ingredient selected from the group consisting of:
   (I) a combination comprising
      (a) an amine-, polyol-functional siloxane having a general formula

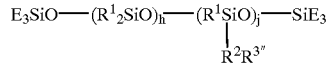

wherein each E is independently selected from the group consisting of a monovalent hydrocarbon group, a hydroxyl group, and an alkoxy group; each $R^1$ is independently a monovalent hydrocarbon group; each $R^2$ is independently a divalent hydrocarbon group having 1 to 10 carbon atoms;

h is 25 to 1,000; j is 0.1 to 200; and each $R^{3'''}$ is a heterocyclic nitrogen-containing compound including

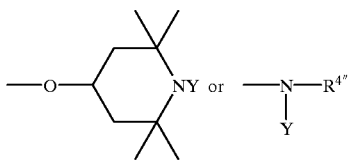

wherein each $R^{4''}$ is independently selected from the group consisting of a hydrogen atom, a monovalent hydrocarbon group and a group of formula—$R^2NY_2$, each Y is independently a hydrogen atom or Y', with the proviso that not all Y=hydrogen, and each Y' is a group of formula

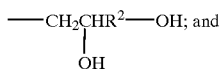

(b) a polyol-, amide-functional siloxane having a general formula

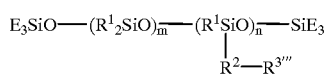

wherein E, $R^1$, and $R^2$ are as described above, m is 25 to 1,000, n is 0.1 to 100; and each $R^{3'''}$ is a heterocyclic nitrogen-containing compound including

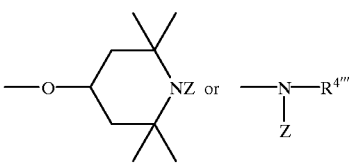

wherein each $R^{4'''}$ is independently selected from the group consisting of a hydrogen atom and a group of formula—$R^2NZ_2$, each Z is selected from the group consisting of a hydrogen atom and Z', with the proviso that not all Z=hydrogen, and Z' is a group having a formula

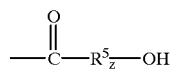

wherein each $R^5$ is a divalent hydrocarbon group of 1 to 7 carbon atoms, and z is an integer from 1 to 7 inclusive; and (II) an active ingredient comprising an amine-, polyol-, amide-functional siloxane copolymer having a general formula:

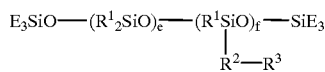

wherein E, $R^1$, and $R^2$ are as described above, e is 25 to 1,000, and f is 0.1 to 200; each $R^3$ is a heterocyclic nitrogen-containing compound including

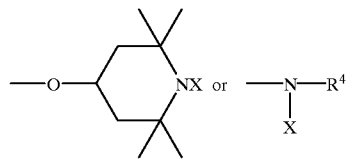

wherein each $R^4$ is independently selected from the group consisting of a hydrogen atom, a monovalent hydrocarbon and a group of formula —$R^2NX_2$, each X is independently a hydrogen atom or X', with the proviso that not all X=hydrogen, each X' is independently selected from the group consisting of Y' and Z'; and (B) a carrier.

2. The composition of claim 1, wherein $R^1$ is an alkyl group, $R^2$ is an alkylene group, and

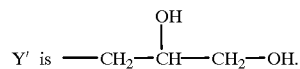

3. The composition of claim 1, wherein active ingredient (A) is present at 5 to 50 wt % of the composition.

4. The composition of claim 1, wherein the carrier is selected from the group consisting of water and organic solvents.

5. The composition of claim 4, wherein the composition has a form selected from the group consisting of a solution and a dispersion.

6. The composition of claim 5, wherein ingredient (B) is an organic solvent.

7. The composition of claim 4, wherein the composition is selected from the group consisting of a dispersion and an emulsion.

8. The composition of claim 7, wherein the composition is an emulsion, ingredient (B) is water, and the composition further comprises ingredient (C), a surfactant.

9. The composition of claim 8, wherein active ingredient (A) is present at 5 to 25 wt % of the emulsion.

10. The composition of claim 8, wherein the surfactant is selected from the group consisting of cationic and nonionic surfactants.

11. The composition of claim 10, wherein the surfactant comprises nonionic ethoxylated branched and linear alcohols having 11 carbon atoms.

12. The composition of claim 8, wherein the surfactant is present at 5 to 20 wt % of the emulsion.

13. The composition of claim 8, further comprising greater than 0 to 2 wt %, based on the weight of the emulsion, of ingredient (D), an organic acid.

14. The composition of claim 13, wherein the organic acid is an acetic acid.

15. A method for treating fibers comprising:
1) applying to a fiber, a fiber treatment composition comprising:
   (I) a combination comprising
   (a) an amine-, polyol-functional siloxane having a general formula

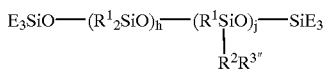

wherein each E is independently selected from the group consisting of a monovalent hydrocarbon group, a hydroxyl group, and an alkoxy group; each $R^1$ is independently a monovalent hydrocarbon group; each $R^2$ is independently a divalent hydrocarbon group having 1 to 10 carbon atoms; h is 25 to 1,000; j is 0.1 to 200; and each $R^{3''}$ is a heterocyclic nitrogen-containing compound including

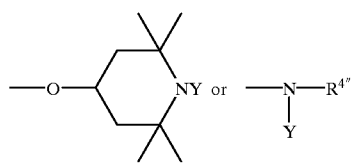

wherein each $R^{4''}$ is independently selected from the group consisting of a hydrogen atom, a monovalent hydrocarbon group and a group of formula —$R^2NY_2$, each Y is independently a hydrogen atom or Y', with the proviso that not all Y=hydrogen, and each Y' is a group of formula

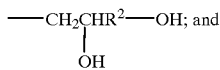

(b) a polyol-, amide-functional siloxane having a general formula

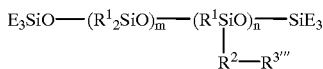

wherein E, $R^1$, and $R^2$ are as described above, m is 25 to 1,000, n is 0.1 to 100; and each $R^{3'''}$ is a heterocyclic nitrogen-containing compound including

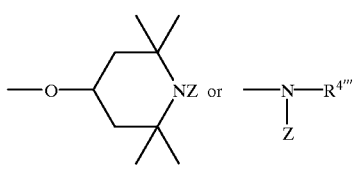

wherein each $R^{4'''}$ is independently selected from the group consisting of a hydrogen atom and a group of formula —$R^2NZ_2$, each Z is selected from the group consisting of a hydrogen atom and Z', with the proviso that not all Z=hydrogen, and Z' is a group having a formula

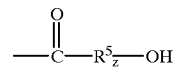

wherein each $R^5$ is a divalent hydrocarbon group of 1 to 7 carbon atoms, and z is an integer from 1 to 7 inclusive; and (II) an active ingredient comprising an amine-, polyol-, amide-functional siloxane copolymer having a general formula:

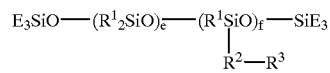

wherein E, $R^1$, and $R^2$ are as described above, e is 25 to 1,000, and f is 0.1 to 200; each $R^3$ is a heterocyclic nitrogen-containing compound including

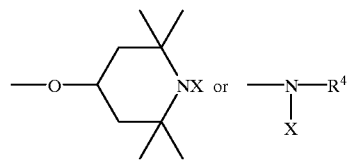

wherein each $R^4$ is independently selected from the group consisting of a hydrogen atom, a monovalent hydrocarbon and a group of formula —$R^2NX_2$, each X is independently a hydrogen atom or X', with the proviso that not all X=hydrogen, each X' is independently selected from the group consisting of Y' and Z'; and (B) a carrier, and thereafter 2) removing the carrier.

16. The method of claim 15, wherein the fiber treatment composition is applied to a fiber in an amount sufficient to provide 0.1 to 15 wt % off the active ingredient (A) on the fiber.

17. A treated fiber prepared by the method of claim 15.

18. The treated fiber of claim 15, wherein the fiber is selected from the group consisting of natural fibers, regenerated fibers, synthetic fibers, and combinations and blends thereof.

19. The fiber of claim 18, wherein the fiber is a natural fiber selected from the group consisting of cotton, silk, linen, and wool.

20. The fiber of claim 18, wherein the fiber is a synthetic fiber selected from the group consisting of polyesters, polyamides, polyacrylonitriles, polyethylenes, polypropylenes; and combinations and blends thereof.

* * * * *